(12) United States Patent  
Doan

(10) Patent No.: US 8,527,153 B2  
(45) Date of Patent: Sep. 3, 2013

(54) AUTOMATED GUIDED VEHICLE (AGV) SYSTEM

(75) Inventor: Paul George Doan, Macomb, MI (US)

(73) Assignee: Fori Automation, Inc., Shelby Township, MI (US)

(*) Notice: Subject to any disclaimer, the term of this patent is extended or adjusted under 35 U.S.C. 154(b) by 32 days.

(21) Appl. No.: 13/179,477

(22) Filed: Jul. 8, 2011

(65) Prior Publication Data

US 2012/0179337 A1    Jul. 12, 2012

Related U.S. Application Data

(60) Provisional application No. 61/362,980, filed on Jul. 9, 2010.

(51) Int. Cl.
| | | |
|---|---|---|
| *B60R 22/00* | (2006.01) | |
| *B60R 21/00* | (2006.01) | |
| *B65G 29/00* | (2006.01) | |
| *B60P 1/02* | (2006.01) | |

(52) U.S. Cl.
USPC ........... 701/49; 280/755; 198/463.1; 414/495

(58) Field of Classification Search
USPC ............................................ 701/49; 414/495
See application file for complete search history.

(56) References Cited

U.S. PATENT DOCUMENTS

| | | | | | |
|---|---|---|---|---|---|
| 2,878,758 | A | * | 3/1959 | D'Altrui ................... 104/172.2 |
| 3,554,328 | A | * | 1/1971 | Jones ............................... 188/5 |
| 3,566,994 | A | * | 3/1971 | Isaacs ............................... 188/5 |
| 3,638,810 | A | * | 2/1972 | Mathew ........................ 414/544 |
| 3,760,906 | A | * | 9/1973 | McGee .......................... 188/4 R |
| 4,137,984 | A | * | 2/1979 | Jennings et al. ............. 180/19.1 |
| 4,339,997 | A | * | 7/1982 | Chiles ........................... 105/216 |
| 4,496,274 | A | * | 1/1985 | Pipes ............................ 414/340 |
| 4,657,463 | A | * | 4/1987 | Pipes ............................ 414/495 |
| 4,746,258 | A | * | 5/1988 | Loomer et al. ............... 414/401 |
| 4,807,716 | A | * | 2/1989 | Hawkins ....................... 180/65.1 |
| 4,818,171 | A | * | 4/1989 | Burkholder .................. 414/497 |
| 5,023,790 | A | * | 6/1991 | Luke, Jr. ......................... 701/24 |
| 5,115,747 | A | * | 5/1992 | Teissier et al. ................. 105/50 |
| 5,344,276 | A | * | 9/1994 | Juan ............................. 414/584 |

(Continued)

FOREIGN PATENT DOCUMENTS

| | | |
|---|---|---|
| JP | 2002-037057 | 2/2002 |
| KR | 10-2004-0060242 | 7/2004 |

OTHER PUBLICATIONS

International Search Report for PCT/US2011/043475 Feb. 9, 2012, 3 pages.
Written Opinion for PCT/US2011/043475 Feb. 9, 2012, 4 pages.

*Primary Examiner* — Thomas Black
*Assistant Examiner* — Tyler Paige
(74) *Attorney, Agent, or Firm* — Reising Ethington P.C.

(57) ABSTRACT

An automated guided vehicle is equipped with a stabilization system for precisely locating, leveling, or otherwise positioning the AGV and its payload with respect to a work piece. The stabilization system includes one or more extension members that extend away from the AGV to engage the ground or a locating assembly installed in the ground. Each extension member may be part of a locating assembly or a leveling assembly. The locating assembly extension member may extend at least partially into an opening of another locating assembly to align the two locating assemblies. The locating assembly may also be configured to provide a leveling function.

30 Claims, 15 Drawing Sheets

(56) References Cited

U.S. PATENT DOCUMENTS

| | | | |
|---|---|---|---|
| 5,490,582 A * | 2/1996 | Trowbridge | 188/2 R |
| 6,095,533 A * | 8/2000 | Balolia | 280/35 |
| 6,371,496 B1 * | 4/2002 | Balolia | 280/35 |
| 7,404,479 B1 * | 7/2008 | Shoemaker et al. | 198/465.1 |
| 2005/0023112 A1 * | 2/2005 | Karnes et al. | 198/838 |
| 2006/0104712 A1 * | 5/2006 | Bufano et al. | 404/1 |
| 2007/0158345 A1 * | 7/2007 | Booth et al. | 220/6 |
| 2008/0308433 A1 * | 12/2008 | Pickard et al. | 206/304 |
| 2009/0074545 A1 * | 3/2009 | Lert et al. | 414/276 |
| 2011/0112728 A1 * | 5/2011 | Stacy, II | 701/49 |
| 2012/0179337 A1 * | 7/2012 | Doan | 701/49 |

\* cited by examiner

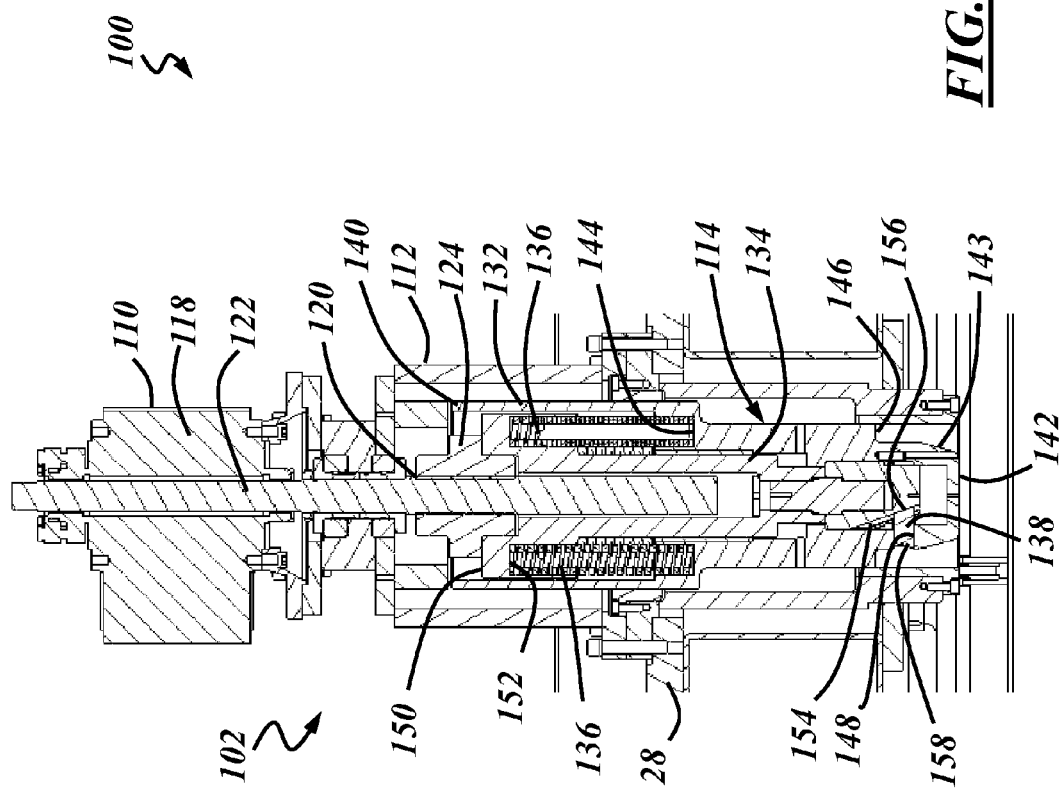

AUTOMATED GUIDED VEHICLE (AGV) SYSTEM

CROSS-REFERENCE TO RELATED APPLICATION

This application claims the priority of U.S. Provisional Application No. 61/362,980, filed Jul. 9, 2010, the entire contents of which are hereby incorporated by reference.

TECHNICAL FIELD

The present disclosure generally relates to automated guided vehicles (AGVs) and, more particularly, to systems for stabilizing AGVs.

BACKGROUND

Automated guided vehicles may be used to transport payloads along a predetermined route without real-time human assistance. For example, an AGV can transport items such as heavy vehicle components like engines, chassis, etc. along a route along a manufacturing plant floor to deliver the payload from one location to another of to allow various manufacturing operations to be performed thereon. Typical plant floors or other surfaces upon which AGVs operate may include irregularities that do not affect their normal operation as they travel from one location to another. For example, some AGVs may include shock absorbing or similar systems to allow the AGV to traverse irregular surfaces without disturbing the payload. AGVs may offer the ability to carry payloads too heavy for a person to carry and without the supervision of a person, while also offering the flexibility to be reconfigured to follow a different route or carry different types of payloads.

SUMMARY

In accordance with one embodiment, there is provided an automated guided vehicle that includes a support structure, a drive mechanism attached to the support structure that moves the AGV along the ground, and a stabilization system attached to the support structure. The stabilization system includes an extension member that extends away from the AGV and engages the ground, or an assembly installed in the ground, to help stabilize the AGV when the drive mechanism is not moving the AGV along the ground.

In accordance with another embodiment, there is provided a stabilization system for an automated guided vehicle that includes an upper locating assembly attached to the AGV, a lower locating assembly installed in the ground at a known location, and an extension member that is part of either the upper or lower locating assembly. The extension member extends toward the other of the upper or lower locating assembly and causes the upper and lower locating assemblies to be in a locked engagement when the AGV is at the known location.

In accordance with another embodiment, there is provided a method of using an automated guided vehicle that includes the steps of (a) moving the AGV to a predetermined location along the ground; (b) extending an extension member from the AGV toward the ground; (c) causing the extension member to engage the ground or a locating assembly installed in the ground; and (d) stabilizing the AGV at the predetermined location.

DESCRIPTION OF THE DRAWINGS

Preferred exemplary embodiments of the invention will hereinafter be described in conjunction with the appended drawings, wherein like designations denote like elements, and wherein:

FIG. 12 is a cross-sectional view of the upper locating assembly of FIG. 10;

DESCRIPTION OF THE ILLUSTRATED EMBODIMENTS

The automated guided vehicle (AGV) system described below may include any type of automated guided vehicle AGV. An AGV is typically an unmanned and self propelled vehicle that travels around a guided path or route laid out on the floor of a factory, warehouse, distribution center, graded earth, etc. Some examples of potential AGV applications include handling materials, delivering parts in a warehouse, and advancing a workpiece or assembly, such as a vehicle chassis, through various stages of a manufacturing process, to cite a few. As will be further described herein, AGVs can also be used to guide manufacturing equipment to stationary workpieces to perform manufacturing processes thereon. This can be particularly useful when performing manufacturing processes on large workpieces that may be difficult to move, such as aerospace fuselages, the hulls of ships, and the like. Skilled artisans will appreciate that there are a number of different types of AGVs, including those that use optical sensors, magnetic sensors, electric field sensors, global positioning system (GPS) sensors, inertial guidance means, laser guidance, and human control via a joystick or other control device to navigate the AGV along a desired path, to name a few examples. The AGV system described below is not limited to any particular type of AGV and may be used with any of the previously mentioned examples, as well as any other type of AGV known in the art.

Figure 1:
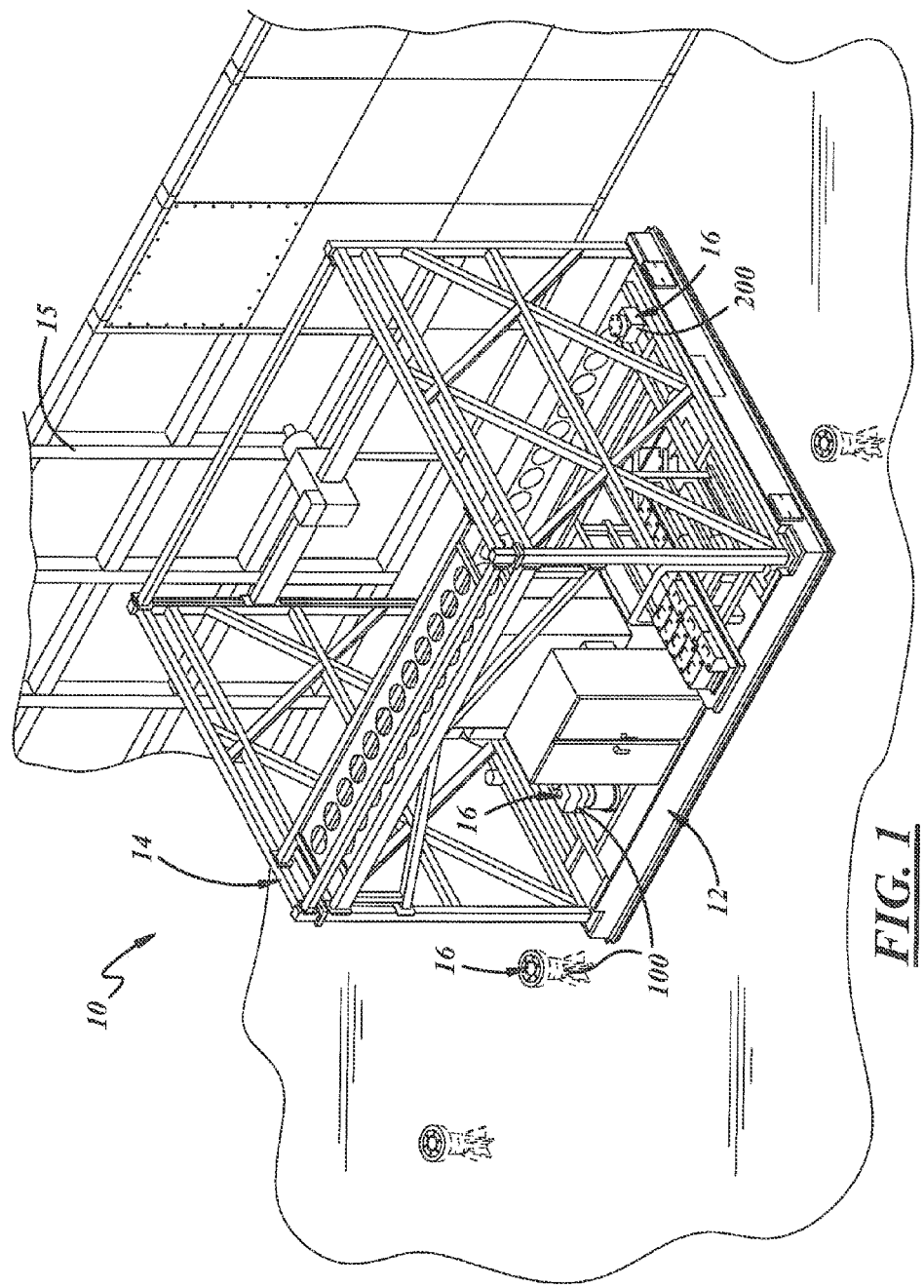
FIG. 1 is a top isometric view of an AGV supporting a payload and including a stabilization system according to one embodiment.

FIG. 1 shows an exemplary AGV system 110 according to one embodiment that includes an AGV 12 supporting a payload 14 and including a stabilization system 16. The AGV 12 supports and transports the payload 14 to a workpiece such as an aircraft fuselage, ship hull, or other type of work piece such as structural framework 15. In this embodiment, the payload 14 includes manufacturing equipment that is securely attached to the AGV 12; however, AGV 12 may carry any type of suitable payload and is not limited to the exemplary payload shown here. The stabilization system 16 can include various components, some of which may be attached to the AGV 12 and some of which may be separate from the AGV 12 and located in the ground, as indicated. The stabilization system 16 will also be described in greater detail below.

Automated Guided Vehicle (AGV)

Figure 2:
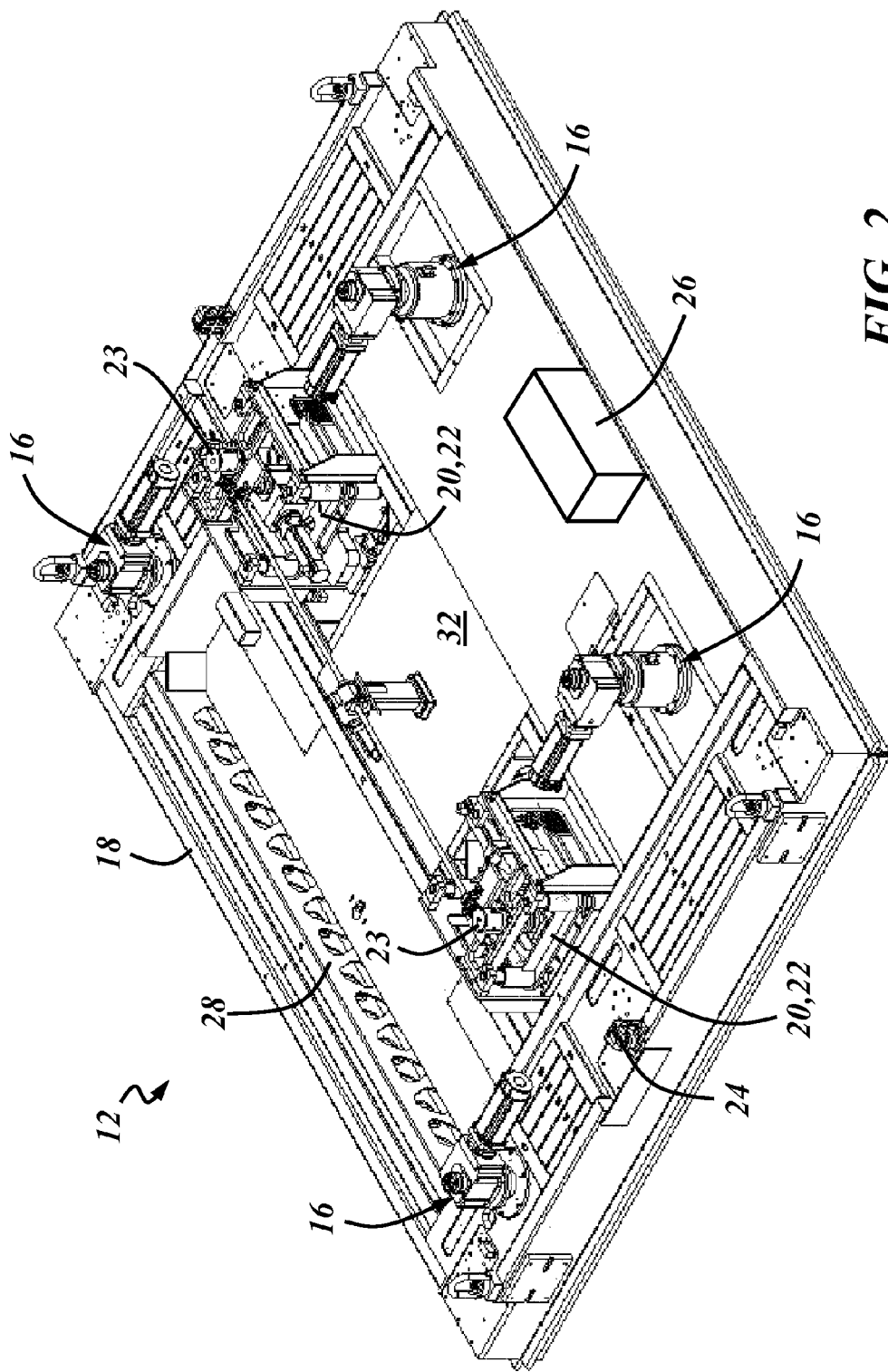
FIG. 2 is a top isometric view of the AGV of FIG. 1 with the payload removed.
Figure 3:
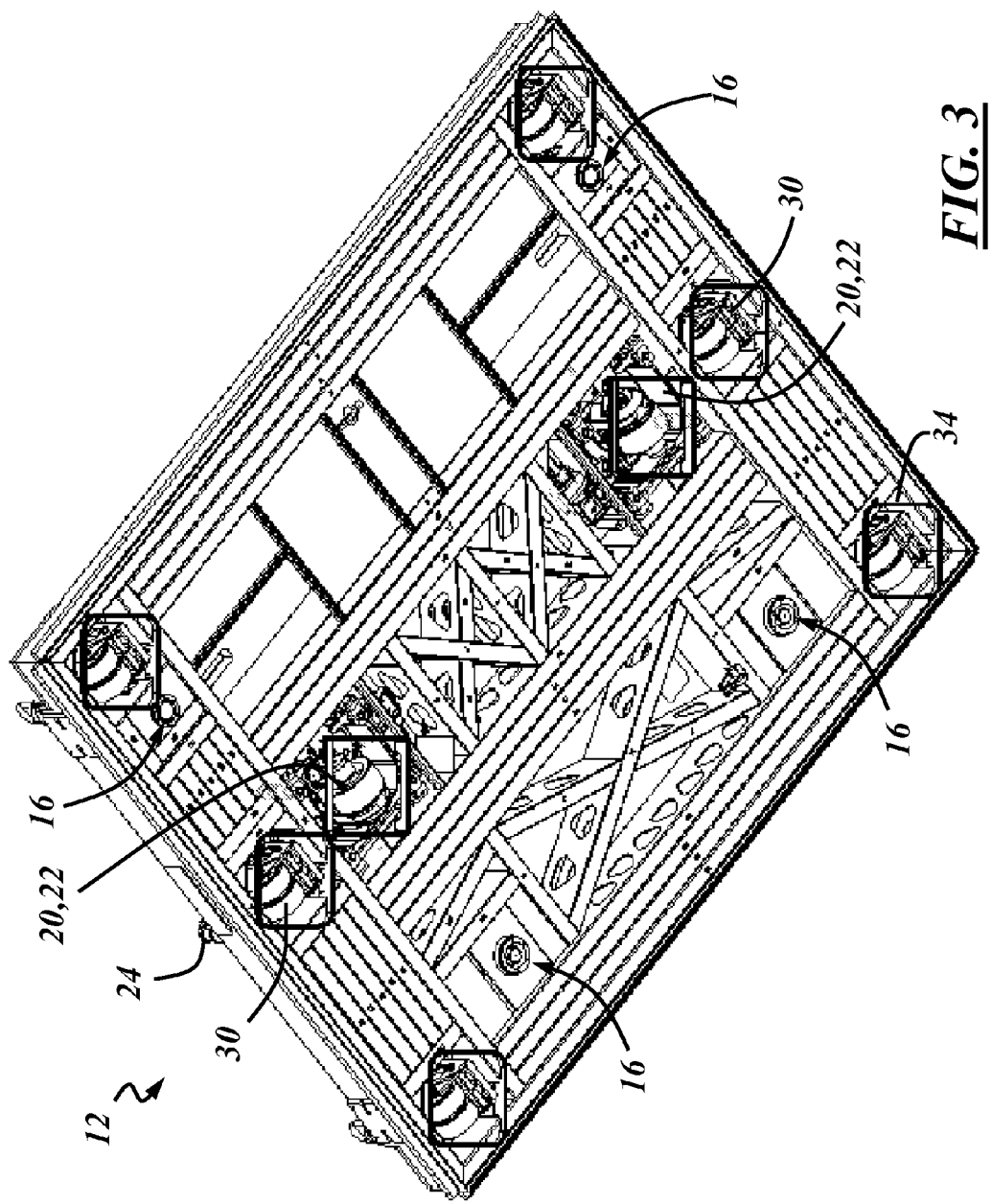
FIG. 3 is a bottom isometric view of the AGV of FIG. 2.

FIGS. 2 and 3 show an exemplary AGV 12 according to one embodiment with no payload. The AGV 12 generally includes stabilization system 16, a support structure 18, drive mechanisms 20, steering mechanisms 22, retraction mechanisms 23, a guidance system 24, and an electronic control unit (ECU) 26. Stabilization system 16 includes various components such as locating and/or leveling mechanisms as described in greater detail below. The stabilization system 16 shown FIGS. 2 and 3 includes either a locating assembly or a leveling assembly in each of the four quadrants of the AGV 12. Support structure 18 is a structure to which various other AGV or AGV system components may be attached and may include a framework 28, rollers 30, and one or more panels 32. Framework 28 may include various support members joined together to form a skeletal frame or chassis that can accommodate or support other components and, in this particular embodiment, is generally rectangular in overall shape. The framework can include various openings to allow AGV system components or other components to pass through the framework from above it to below it. For example, as indicated in FIGS. 2 and 3, exemplary drive and steering mechanisms 20, 22 are attached to the framework 28 and have portions above, below, and within the framework. Of course, framework 28 can be constructed as a unitary structure and can have a solid panel or platform that may or may not have other features such as openings formed with it.

Rollers 30 may include wheels, casters, or other rolling components to support the framework 28 and allow the support structure to move along the ground or floor with low resistance to movement. In this embodiment, the rollers 30 comprise casters that are attached to framework 28 such that they swivel about a vertical axis so that, as the support structure changes direction during AGV operation, the rollers can freely self-orient to align with the direction of AGV movement. Six casters are shown in the embodiment of FIG. 3 one at each of the four corners of the framework 28, and two others in line with the drive and steering mechanisms 20, 22. Any number of rollers may be used, or they may be omitted entirely, such as in embodiments where the entire weight of the vehicle is supported by drive and/or steering mechanisms.

Panels 32, some examples of which are shown in FIGS. 2-3, are generally planar components that can be attached to framework 28. In some instances, panels 32 provide additional surface area for the attachment of various other components to the support structure 18, they cover or conceal openings in the framework 28, or they are provided for other reasons. Of course, panels 32 can include contoured surfaces as well, as they are not limited to flat, planar panels or sheets. As shown in FIG. 3, support structure 18 may also include cleaning elements 34, such as brushes, that surround the rollers and contact the floor upon which the AGV rolls. The cleaning elements 34 can serve to clear debris away from the path of each roller to keep the rollers clean and may also be included around components of the drive and steering mechanisms 20, 22 that come into contact with the ground to clear debris from their paths as well.

Drive mechanisms 20 generally drive, move, or propel the AGV 12 as it makes its way along the ground or other surface. Drive mechanisms 20 may be attached to the support structure 18, and the number and position of drive mechanisms may vary according to the particular needs of the application. For example, exemplary AGV 12 includes a first drive mechanism toward a front of the AGV and a second drive mechanism toward the rear. In this particular embodiment, both drive mechanisms 20 are located near the widthwise center of AGV 12, but this is not necessary, and as few as one drive mechanism may be included to propel the AGV. The exact number, location and arrangement of the drive mechanisms 20 may be dictated by the nature of the payload that the AGV is expected to transport, as well as the maneuvers or turns that the AGV must make in order to follow the intended route or guided path.

Figure 5:
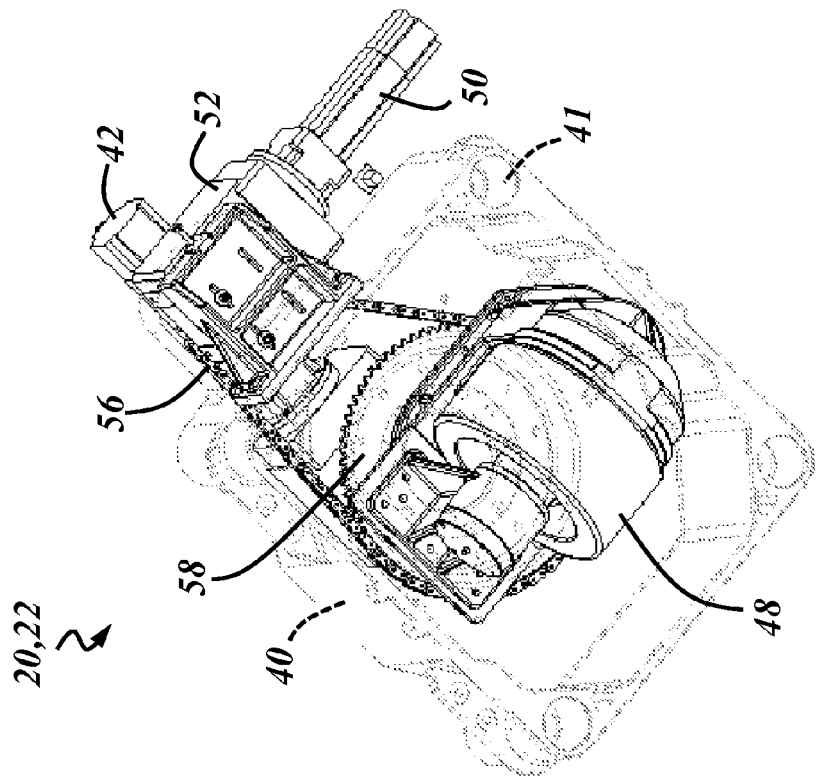
FIG. 5 is a bottom isometric view of the drive mechanism of FIG. 4.
Figure 4:
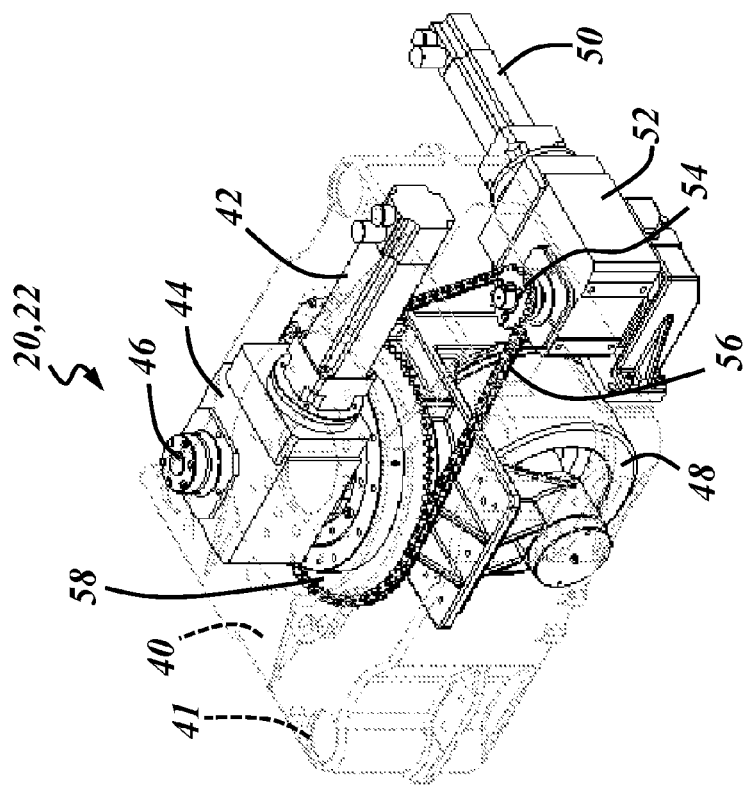
FIG. 4 is a top isometric view of an exemplary drive mechanism that may be used with the AGV of FIG. 2, including a housing shown in phantom view.

FIGS. 4 and 5 show an exemplary drive mechanism 20 according to one embodiment. This particular drive mechanism 20 is integrated with a steering mechanism 22; however, integrated mechanisms are not necessary. Examples of such integrated drive and steering mechanisms, along with various other combinations of mechanisms that may drive and/or steer an AGV, are disclosed in U.S. patent application Ser. No. 12/981,269, filed on Dec. 29, 2010, which is hereby incorporated by reference in its entirety. Generally, the embodiment of drive mechanism 20 shown in FIGS. 4 and 5 includes a housing 40, a drive motor 42, a first transmission 44, a drive shaft 46, a second transmission (not shown), and a drive wheel 48.

Housing 40 is a component that partially encloses and supports other drive mechanism components and is shown in phantom in FIGS. 4 and 5. The housing 40 may include one or more guide holes 41 such as those shown to help guide the drive mechanism up and down when the retraction mechanism is operating, as will be described. Guide holes 41 may also help guide the drive mechanism up and down as downward force is applied to it to maintain constant drive wheel force against the ground while the AGV is guided over irregular surfaces. Drive motor 42 powers the various moving components of drive mechanism 20 and is preferably an electric motor, such as a servo or other type of electric motor. It is mounted to the housing 40 and ultimately powers drive wheel 48 for purposes of vehicle propulsion. Mounting the drive motor 42 to the housing 40 can also allow the drive motor 42 to remain stationary even when the drive wheel is being steered. In this embodiment, drive motor 42 is mounted in a horizontal orientation and interfaces with first transmission 44 which changes the rotational output from a horizontal axis to a vertical axis—e.g., a vertical axis that is aligned with the axis of drive shaft 46. Drive shaft 46 in-turn interfaces with the second transmission to again change the rotational output back to an orientation that is aligned with a horizontal axis—e.g., the horizontal axis this of drive wheel 48. Each drive transmission may also include gearing to increase or decrease the rotational speed of and available torque from each component ultimately turned by the motor. This is of course only one example of a potential drive mechanism. Other methods and mechanisms for driving a wheel may be used with drive wheel 48 to propel the AGV, as AGV 12 is not limited to this particular drive mechanism.

Steering mechanism 22 can also be described with reference to FIGS. 4 and 5. Steering mechanism 22 steers or guides the AGV and, according to this particular embodiment, includes a steering motor 50, a gearbox 52, a motor sprocket 54, a steering chain 56, and a steering sprocket 58. Steering motor 50 is preferably an electric motor, such as a servo or other type of electric motor. In this embodiment, steering motor 50 is mounted to the housing 40 an that the steering motor 50 can remain stationary while it steers drive wheel 48. Steering motor 50 is shown mounted off-to-the-side of housing 40 in a horizontal orientation and interfaces with gearbox 52 to change the rotational output of the motor from a horizontal axis to a vertical axis—e.g., a vertical axis that is aligned with the axis of motor sprocket 54. Steering chain 56 transfers movement from motor sprocket 54 to steering sprocket 58. Steering sprocket ultimately turns drive wheel 48 about a vertical drive shaft 46 through attachment to common components that cause the steering sprocket 58 and drive wheel to move together. The details of exemplary structures for isolating and/or integrating the movement of the various components of the drive and steering mechanisms can be better understood with reference to the previously incorporated U.S. patent application Ser. No. 12/981,269. This is of course only one example of a steering mechanism, as other steering mechanisms may be used instead. It should be understood that any number of combinations of drive and steering mechanisms 20, 22 are possible. While the embodiment shown in the figures integrates these two mechanisms, each mechanism could be provided separately. For example, drive mechanism 20 can drive a wheel that is not steered, and steering mechanism 22 can be used to steer a wheel that is not driven. For instance, an AGV may include a single integrated drive and steering mechanism that propels and steers the AGV, it may include multiple integrated drive and steering mechanisms that propel and steer the AGV, or it may include an integrated drive and steering mechanism that both propels and steers the AGV along with a drive mechanism that only propels the AGV, to name but a few examples.

Figure 6:
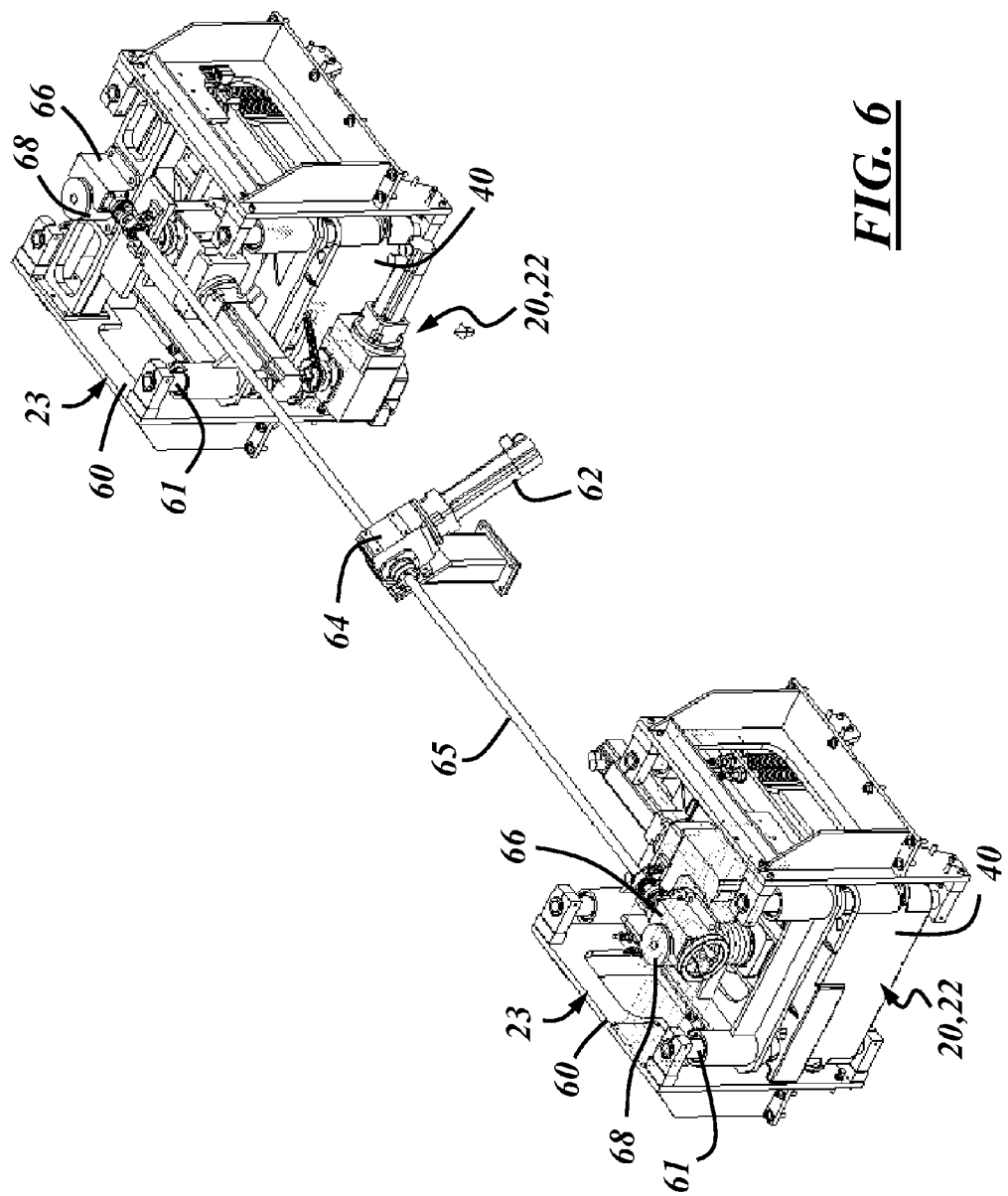
FIG. 6 is a top isometric view of an exemplary retraction mechanism that may be used with the AGV of FIG. 2.
Figure 7:
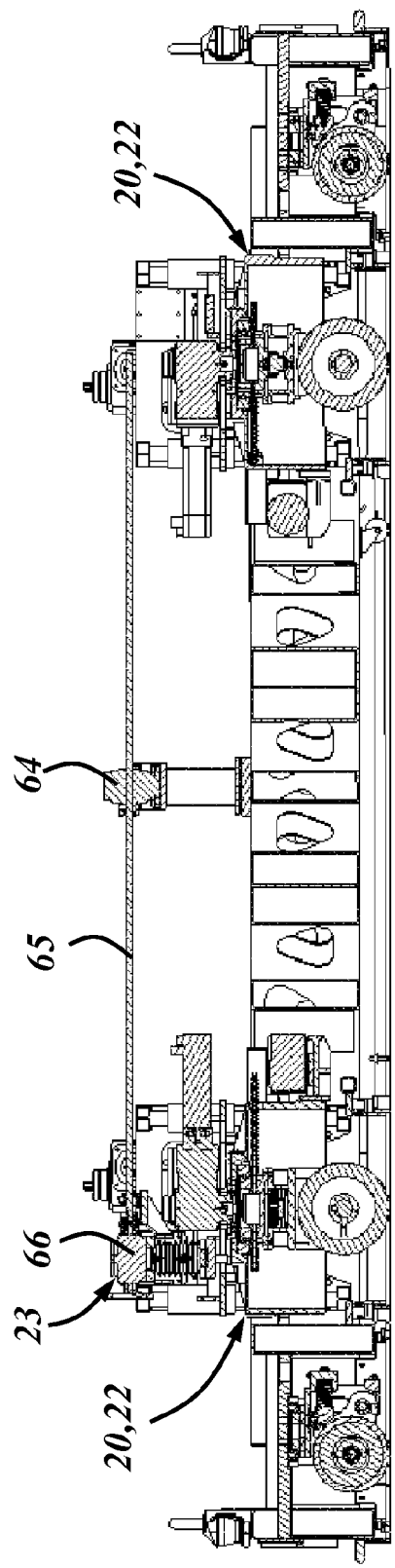
FIG. 7 is a side cross-sectional view of the AGV of FIG. 2, including cross-sectional views of exemplary retraction and drive mechanisms.
Figure 8:
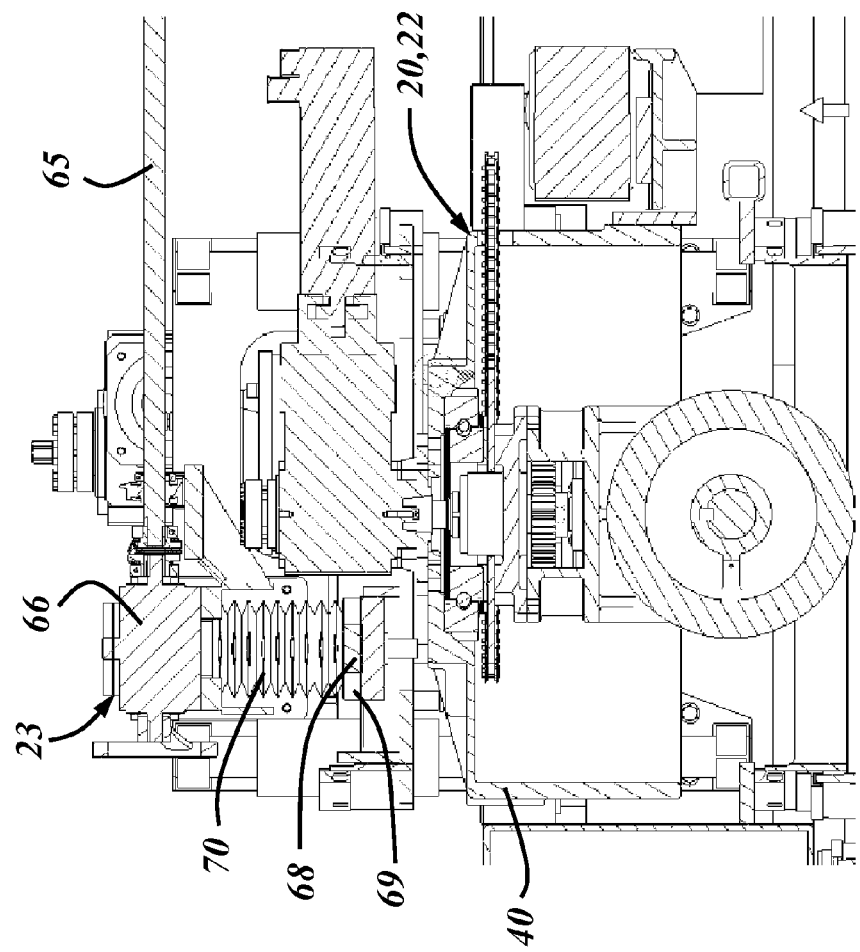
FIG. 8 is an enlarged side cross-sectional view of a portion of the retraction and drive mechanisms of FIG. 7.

Referring now to FIGS. 6-8, exemplary retraction mechanisms 23 are shown. Retraction mechanisms 23 can at least partially retract or lift any of the various wheels of the AGV 12 to move them away from the ground so that the weight of the AGV is supported by other components such as rollers, stabilization system components, or other components. For example, when the AGV is driven to a new location, it may be advantageous to retract drive mechanisms 20 so that the AGV has freedom of movement on rollers 30; this may better enable fine and precise maneuvering or locating so that the stabilization system components can be property aligned. Retraction of drive mechanisms 20 may also be useful if the AGV malfunctions or if its power source becomes depleted and it needs to be towed. Retraction of integrated drive and steering mechanisms such as that described above can also allow 90° or sharper turns by the AGV by allowing the drive and steering mechanisms to be retracted, turned, then lowered back to the ground, providing the AGV with possible zero-turning radius maneuverability.

In the embodiment shown, dual retraction mechanisms 23 are coupled to exemplary drive and steering mechanisms 20, 22, and each includes a subframe 60, a gearbox 66, and a lead screw 68. In this particular embodiment, a single retraction motor 64 operates both retraction mechanisms 23 via gearbox 64 and connecting rod 65. Subframe 60 is a structural component to which other retraction mechanism components may be attached and is the component of retraction mechanism 23 that may be affixed to the AGV 12. The subframe 60 may include one or more guide shafts 61 which, together with the guide holes of the drive mechanism, help guide the drive and steering mechanisms 20, 22 up and down when the retraction mechanism is operating. These features may also assist when downward force is applied to the mechanisms to maintain constant drive wheel force against the ground while the AGV is guided over irregular surfaces. The guide components may be useful when the lead screw 68 is attached to the drive mechanism in a location that is off-center, as best shown in FIG. 8. In this embodiment, each of the two retraction mechanisms 23 shown share a single retraction motor 62 and a single first gearbox 64, but they could have their own motors and gearboxes instead. Retraction motor 62 is preferably an electric motor, such as a servo or other type of motor. It interfaces with first gearbox 64 to change the axis of the rotational output from the motor to the axis of connecting rod 65, which in this case is horizontal. Connecting rod 65 interfaces with each of second gearboxes 66, which may be affixed to respective subframes 60 of the retraction mechanisms. Second gearbox 66 interfaces with lead screw 68, which is oriented such that its rotational axis is vertical.

Lead screw 68 can be any of several types known in the art that convert rotational motion to linear motion or translation. Lead screws generally perform this function by rotating a threaded rod within an internally threaded collar, where the collar is affixed to the component that is to be moved up and down. The collar operates like a standard nut and moves along the threaded rod as the threaded rod rotates. The details of the interface between the lead screw 68 and the drive and steering mechanisms 20, 22 is only partially shown in the figures. For example, referring to FIG. 8, only a small portion of the threaded rod of the lead screw 68, specifically the portion that interfaces with collar 69, is shown below a bellows or dust cover 70, which covers the upper portion of the threaded rod. In one embodiment, the collar 69 is affixed either directly or indirectly to the housing 40 of the drive mechanism 20 so that when the threaded rod of the lead screw rotates, the housing 40 is moved vertically upward or downward, depending on the direction of rotation of the threaded rod. The lead screw 68 may be a ball screw, as is known in the art, wherein the collar is a ball assembly that moves and recirculates load-bearing balls along the threads of the threaded rod to enable translation in a lower friction and more precise manner. This is of course only one of several possible embodiments of retraction mechanism 23, and a variety of others are possible. For example, each retraction mechanism 23 may have its own dedicated retraction motor 62, and any number of retraction mechanisms may be used with the AGV. Depending on the particular application, other actuators may be used in place of the retraction motor and lead screw combination to raise and lower the various wheels of the AGV, such as fluid powered cylinders or other devices. Any type of mechanism for raising and lowering the drive and/or steering mechanisms may be used.

The AGV guidance system 24 may be any of several known in the art, and can include various components depending on the type of guidance system employed. In one embodiment, the guidance system includes electromagnetic sensors, preferably on the bottom side of the AGV. The electromagnetic sensors can sense magnetic fields produced by an energized electrical cable or ribbon that may be installed below or on the surface of the ground or floor upon which the AGV is intended to operate. The guidance system 24 can also include anti-collision sensors (this is the component of the guidance system labeled in FIG. 2, for example). Anti-collision sensors may emit and detect radio frequency, infrared, laser, or other typically non-visible light or magnetic fields to detect objects that may lie in the path of the AGV. Of course, other types of guidance systems, such as those that use optical, magnetic, electric field, GPS, inertial, laser, and/or other types of sensors may be employed as well. The AGV system described herein is certainly not limited to any one type of guidance system.

Electronic control unit (ECU) 26 may included as a part of AGV 12, part of the stabilization system 16, or both. Each of AGV 12 and stabilization system 16 may have different ECUs, for example. An ECU may receive information from throughout the AGV, process that information, and control various aspects of operation accordingly. ECU 26 can be a stand-alone unit or it may be combined with any number of other control units, systems, or other components. It can be a single discrete unit, or it can comprise multiple units dispersed in various locations. And any unit or units may include various combinations of hardware and software components that work together to perform ECU functions. By way of example, the ECU 26 may work with anti-collision features of guidance system 24 to avoid colliding with objects in the AGV's path. ECU 26 may also work with various components of the stabilization system 16 to stabilize the AGV and its payload. Other systems and mechanisms that the ECU may work with include, but are certainly not limited to, drive mechanism 20, steering mechanism 22, and/or retraction mechanism 23. Where included as part of stabilization system 16 or where configured to communicate with stabilization system 16, the ECU may be couple to and/or receive information from one or more sensors and use that information to help control stabilization system components.

Payload

The payload 14 that is shown in FIG. 1 is an example of a machine that fastens panels to framework 15 with rivets or other types of fasteners and is only one example of manufacturing equipment. The payload 14 may include other manufacturing equipment such as multi-axis robots fitted with various tools for performing manufacturing operations. It could also include equipment for welding, drilling, cutting, grinding, buffing, painting, applying adhesives or sealants, component assembly or any of a number of other manufacturing processes. Payload 14 is not limited to manufacturing equipment. AGV 12 may carry or support any number of different payloads, including instances in which the payload is the workpiece. In one embodiment, the payload 14 includes a workpiece such as an automobile chassis. In this example of an AGV system, the AGV transports the automobile chassis to a location where manufacturing or assembly operations can be performed thereon and can also benefit from the stabilization system described herein. The payload may be supported by the support structure and include one or more components that are specifically positioned on the AGV so that stabilizing the AGV at a known location with respect to the ground places the component(s) at a known position with respect to a work piece or with respect to separate manufacturing equipment.

Stabilization System

Stabilization system 16 is a system that can help stabilize the AGV 12 and any payload 14 that it supports or carries. As used herein, the term "stabilize" broadly includes any locating, locking, securing, supporting, leveling, positioning, aligning, orienting, and/or other operations that maintain the AGV and/or its payload in a desired position or orientation. Stabilization system 16 may include one or more components attached to the support structure of the AGV. In one exemplary embodiment, stabilization system 16 includes a plurality of mechanisms, such as one or more locating mechanisms 100 and one or more leveling mechanisms 200, examples of which will be further described below. Some embodiments of stabilization system 16 may include one or more locating mechanisms but no leveling mechanism, other embodiments may include one or more leveling mechanisms but no locating mechanism, while other embodiments may include one or more locating and leveling mechanisms. Stabilization system 16 may include various other components that help stabilize the AGV when the drive mechanism is not moving the AGV along the ground in addition to or in lieu of the locating and leveling mechanisms shown herein, and different components of the stabilization system may work together to help locate and level the AGV. In one embodiment, such as the particular embodiment shown in FIGS. 2 and 3, the AGV includes two locating mechanism assemblies and two leveling mechanism assemblies.

Figure 9:
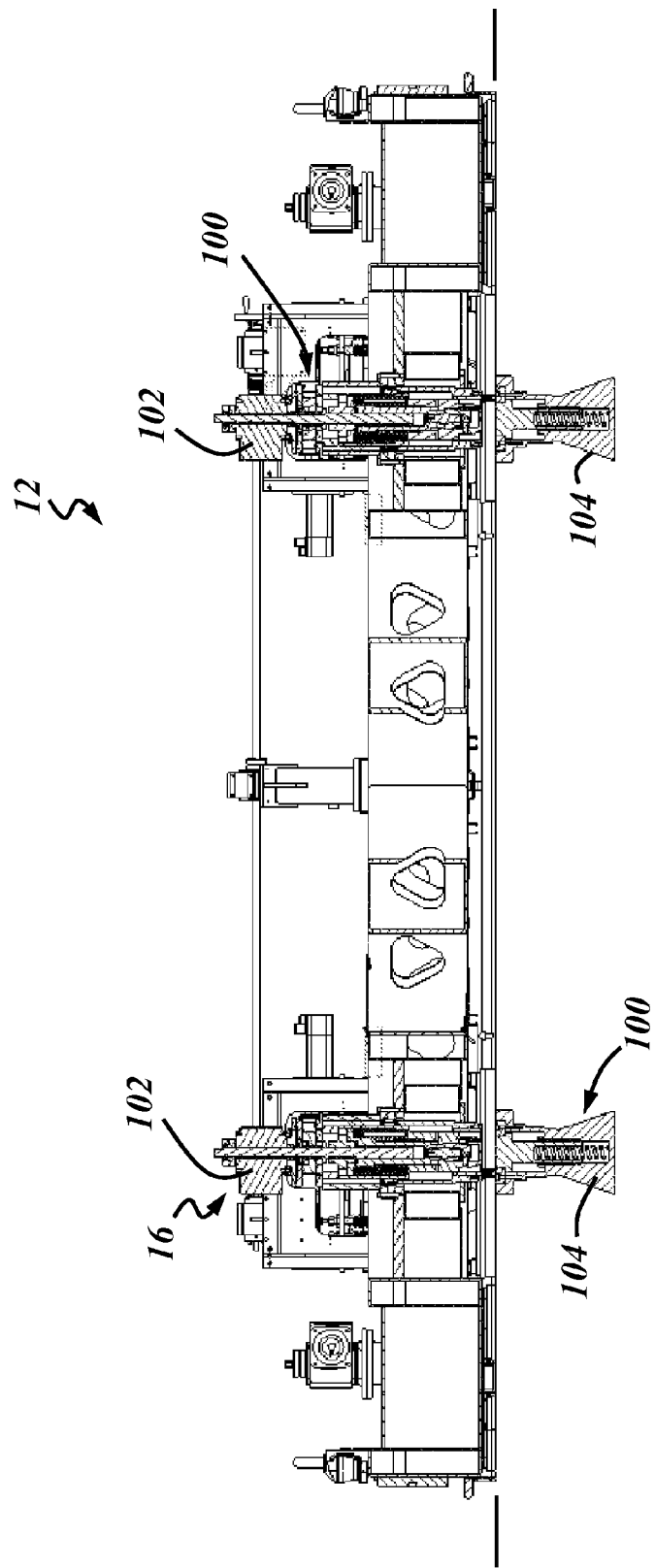
FIG. 9 is a side cross-sectional view of the AGV of FIG. 2, including cross-sectional views of exemplary locating mechanisms.

Referring now to FIGS. 9-15, an exemplary locating mechanism 100 is shown that may be used to precisely locate AGV 12 along the ground and/or to securely maintain the AGV in a desired position. FIG. 9 shows a pair of exemplary locating mechanisms 100 in cross-section, where some of the locating mechanism components are part of the AGV 12 and some are installed in the ground. Each exemplary locating mechanism 100 includes an upper locating assembly 102 and a lower locating assembly 104 that interact with one another to locate and/or secure the AGV in a certain position on a factory floor, for example. In this embodiment, each upper locating assembly 102 is attached to the support structure 18 of AGV 12 and each lower locating assembly 104 is affixed to or installed in the ground, such as the floor of a manufacturing facility. As shown, a plurality of lower locating assemblies 104 may be installed along the ground at certain intervals to correspond with the horizontal distance between each of the upper locating assemblies 102 of the AGV. As best shown in FIG. 1, a series of lower locating assemblies 104 can be installed in the ground at certain positions or stations that correspond to a workpiece so that the AGV can be guided to those positions and can be stabilized in order for the payload to perform its work or task(s).

Figure 11:
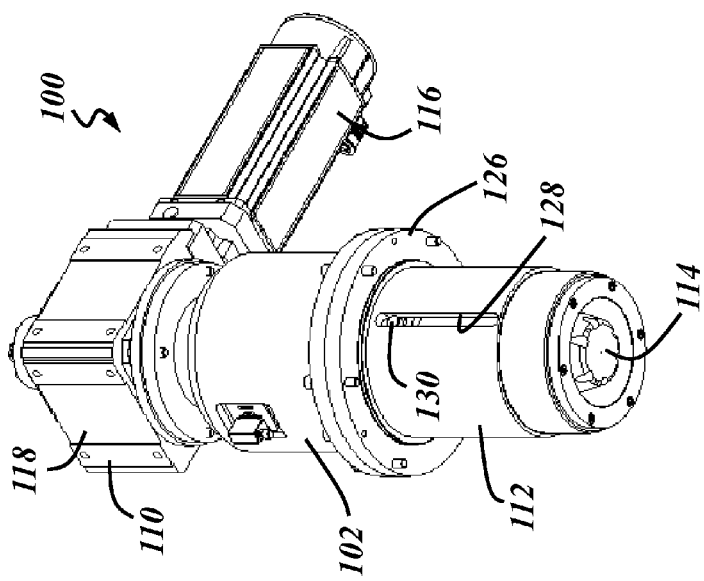
FIG. 11 is a bottom isometric view of the upper locating assembly of FIG. 10.
Figure 10:
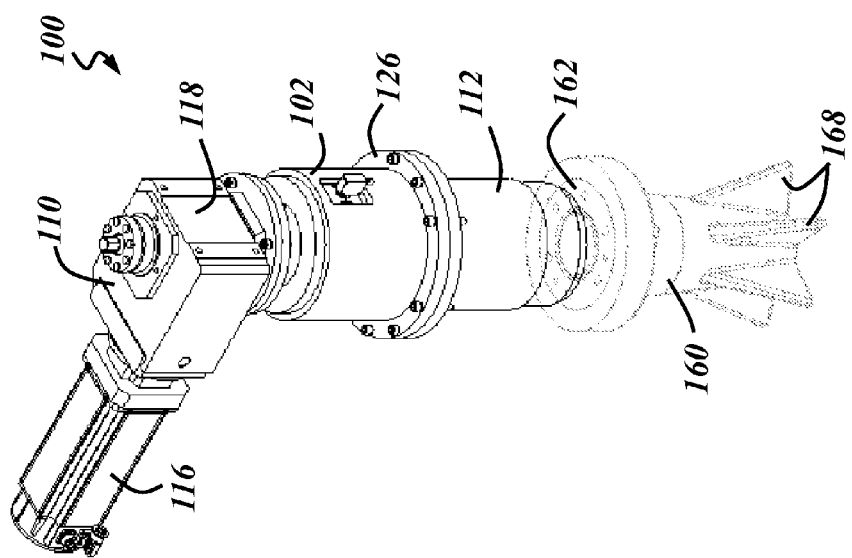
FIG. 10 is a top isometric view of the locating mechanism of FIG. 9, including upper and lower locating assemblies.

Referring now to FIGS. 10 and 11, an exemplary upper locating assembly 102 is shown and includes a drive unit 110, a housing 112, and an extension member 114. Drive unit 110 may include any actuator that can be used to extend and/or retract extension member 114 toward and/or away from lower locating assembly 104. In this embodiment, drive unit 110 includes a motor 116, a gearbox 118, and a lead screw 120, which is best shown in FIG. 12. Motor 116 is preferably an electric motor, such as a servo or other type of motor, that interfaces with gearbox 118 to change the horizontal output from motor 116 such that it is aligned along the vertical axis of lead screw 120. The gearbox 118 may also include gearing or other components to alter the speed or torque of the motor output. Lead screw 120 converts the rotational motion from motor 116 to linear motion in the vertical direction. Lead screw 120 may include threaded rod 122 and collar 124. In a preferred embodiment, lead screw 120 is a ball screw and collar 124 is a recirculating ball assembly. Drive unit 110 can also be any other type of actuator known in the art, such as a fluid powered actuator, an electromagnetic actuator, or any other type of actuator, and is certainly not limited to the exemplary embodiment shown here.

Housing 112 is a structure that may house and/or provide attachment points for some of the components of drive unit 110 and extension member 114. The housing may optionally include various other features such as flange 126 to provide attachment points to attach the upper locating assembly 102 to the AGV. In the embodiment shown in the figures, housing 112 includes an enlongated slot 128 formed therethrough. Slot 128 can receive a pin or dowel 130 that extends radially outward from extension member 114 and prevents extension member 114 from rotating within the housing when it moves up and down under the power of lead screw 120.

Extension member 114 may include any member or component that can extend away from the AGV to engage the ground or an assembly installed in the ground, such as lower locating assembly 104. In the embodiment shown in the figures, extension member 114 extends downward away from the upper locating assembly 102, and therefore away from the AGV, when the drive unit 110 is operated. The exemplary extension member 114 shown in the figures is attached to drive unit 110 and is disposed at least partially within housing 112 and includes outer sleeve 132, inner rod 134, biasing elements 136, and one or more fingers 138. Outer sleeve 132 includes a generally hollow portion at its upper end 140 to accommodate the inner rod 134 and also includes a lower end 142 to engage a lower locating assembly or the ground. As shown, the lower end 142 can have an angled or tapered surface 143 that helps to align or center the upper locating assembly 102 as it descends into or mates with the lower locating assembly 104. Outer sleeve 132 also includes pockets 144, a shoulder 146, and openings 148. Pockets 144 in this embodiment include a plurality of cylindrical recesses to accommodate and help hold the lower ends of biasing elements 136 in place and so that the biasing elements have a surface to push on. A continuous annular recess, shoulder, non-cylindrical recesses, or other surfaces could also be used adjacent the lower ends of biasing elements 136. Shoulder 146 is an annular shoulder and is designed to contact a portion of the lower locating assembly 104 when extension member 114 is descending. Openings 148 allow fingers 138 to extend through the wall of outer sleeve 132 and engage portions of lower locating assembly 104, as will be described in more detail below. The outer surface of outer sleeve 132 may be in contact with portions of the inner surface of housing 112, or with bushings or other low friction members disposed within the housing, to restrict the radial movement and guide the axial movement of extension member 114. Outer sleeve 132 can be formed as a single component, or it may be formed from multiple components. For example, as shown in the illustrated embodiment, lower end 142 is included as part of a separate component of outer sleeve 132 that covers the lower end of inner rod 134.

Inner rod 134 is coaxially disposed within outer sleeve 132. It includes an upper end 150 that is attached to drive unit 110, and more specifically to collar or ball assembly 124, in this embodiment. Inner rod 134 includes pockets 152 near upper end 150 to accommodate upper ends of biasing elements 136; put differently, the biasing elements 136 are compressed between pockets 152 of the inner rod and pockets 144 of the outer sleeve. A continuous annular recess, shoulder, non-cylindrical recesses, or other surfaces could also be used adjacent the upper ends of biasing elements 136, in place of the pockets 152, to provide surfaces for the upper ends of the biasing elements to push against. Inner rod 134 also includes one or more cam surfaces 154 at its lower end to interface with fingers 138 as will be described further below. The cam surface 154 shown in the figures is a flat, angled surface, but the surface could include various other contours to control the movement of fingers 138.

Biasing elements 136 may include springs, such as die springs, disposed between pockets 144 and 152. Their length determines the initial longitudinal or axial position of the outer sleeve 132 and the inner rod 134 in relation to one another when the biasing elements are in a relaxed state, and their stiffness or spring constant determines the force required to move the outer sleeve 132 and inner rod 134 in relation to one another. The cross-sections in the figures show two biasing elements in the extension member 114, but any number of biasing elements may be utilized depending on the required resistance in the particular application.

Fingers 138 are components that extend from an extension member in order to engage a locating assembly. Any extension member can include one or more fingers 138 that mate with corresponding features of the locating assembly being engaged so that the upper and lower locating assemblies can be in a locked engagement. In the embodiment shown in the figures, each finger includes a cam end 156 and a locking end 158. Fingers 138 are slidably maintained in openings 148 in outer sleeve 132. Relative axial movement between inner rod 134 and outer sleeve 132 causes cam surfaces 154 and 156 to engage one another and fingers 138 to extend radially from the extension member 114. The extended fingers are designed to mate with corresponding features, such as an undercut feature, in the locating assembly to place the upper and lower locating assemblies in the locked engagement. Of course, the contours of the cam surface 154 and cam end 156 do not have to be the same. For example, cam surface 154 could be a rounded shape while cam end 156 is flat. Various shapes and contours are possible that will cause fingers 138 to move radially when inner rod 134 moves axially relative to outer sleeve 132. Indeed, a variety of methods and mechanisms could be used to radially extend fingers 138 such as dedicated actuators or other mechanisms.

Of course the extension member 114 described above is only exemplary in nature. Extension member 114 may include any member or component that can extend away from the upper locating assembly 102 to contact or engage a lower locating assembly 104 in the ground. In another embodiment, it may include a simple rod or shaft that engages openings in the ground or in the lower locating assembly without locking the two locating assemblies together. Stated differently, it is possible for the upper and lower locating assemblies to mate with or engage one another for locating or aligning purposes, without separately locking to one another. The locking features provided by fingers 138 are therefore optional and are not required in all embodiments.

Figure 13:
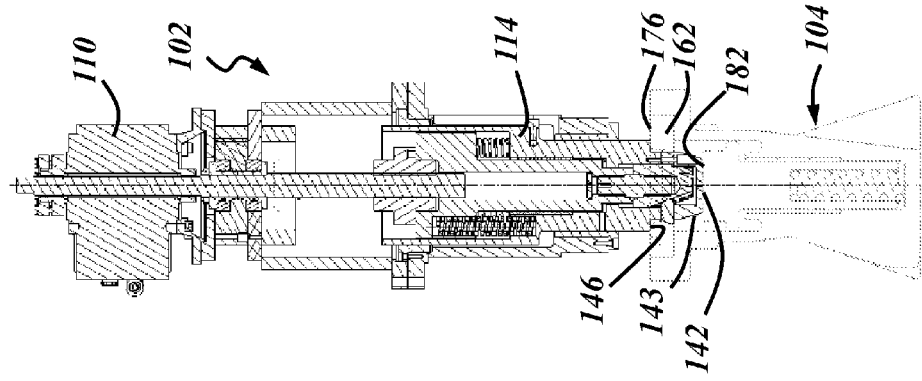
FIG. 13 is a cross-sectional view of one of the locating mechanisms of FIG. 9 showing the upper and lower locating assemblies not engaged with each another.

An exemplary lower locating assembly 104 is shown in FIGS. 9, 10, and 13-15, the components of which are best described with reference to the cross-sectional view of FIG. 13. In this embodiment, lower locating assembly 104 includes a housing 160, a locating ring 162, a plug 164, and a biasing element 166. Housing 160 is a structure that can be installed in, embedded in or otherwise affixed in or to the ground or floor. The embodiment in the figures includes a plurality of fins 168 at or near the lower end of the housing 160. Fins 168 extend radially from the main part of the housing and include multiple surfaces that, when installed in the ground, provide the housing with additional stability, including resistance to movement in at least the longitudinal (up and down) and circumferential (rotation about the center of the housing) directions. Housing 160 includes a generally hollow interior with an opening 170 sized to accommodate the other components of the lower locating assembly and also includes an annular recess 174 that is formed at its top end and is sized to accommodate locating ring 162.

Locating ring 162 may be one portion of a locating assembly that extension member 114 contacts or otherwise engages. In this embodiment, locating ring 162 is a ring-shaped or annular component defining a top surface 176, a bottom surface 178, and a central opening 180. The locating ring 162 nests in the annular recess 174 at the top end of housing 160 and is securely attached thereto. The top surface 176 of the locating ring is generally flush with the top surface of housing 160 and, in the embodiment shown, provides a surface for extension member 114 to contact. The central opening 180 of the locating ring receives an end portion of extension member 114 and can help align the upper and lower locating assemblies together at the known location of the lower locating assembly. The opening 180 may be shaped to have a close-fitting arrangement with the end portion of the extension member to facilitate such alignment. In those embodiments where lower end 142 includes a tapered surface 143, central opening 180 may be designed to help guide or direct extension member 114 as it is being lowered. Central opening 180 may smaller than the opening 170 of the housing and provide an undercut portion that fingers 138 can engage. In the embodiment shown, the undercut portion is in the form of an annular chamfer that extends from the central opening 180 to the bottom surface 178 of the locating ring. The portion of the bottom surface 178 that extends radially inward beyond the opening 170 of the housing could also act as an undercut portion. It is also possible for locating ring 162 to have one or more openings on its inner circumference (i.e., on central opening 180) for capturing fingers 138 instead of relying on the undercut portion. Of course, an undercut portion is not necessary for the fingers 138 to help locate the AGV. Fingers 138 can simply mate with the vertical surface or surfaces of central opening 180 to help align the upper and lower locating assemblies, or they may be omitted altogether.

Plug 164 and biasing element 166 work together to close off the central opening 180 of the locating ring 162 when the corresponding lower locating assembly 104 is not engaged with an upper locating assembly. The plug 164 includes a top surface 182, a shoulder 184, and a pocket 186. Top surface 182 is generally flush with the top surface 176 of the locating ring when the plug 164 is in its fully upward position as in FIG. 13. Biasing element 166 forces the plug 164 into this position in the absence of any downward force on the top surface 182. Also in this position, shoulder 184 is restrained from further movement by the bottom surface 178 of locating ring 162. When the plug 164 is in this fully upward position, it closes off central opening 180 to prevent debris or other objects from filling into the lower locating assembly 104 and interfering with its operation.

In another embodiment, the housing 160, plug 164, and biasing element 166 may be omitted so that the lower locating assembly 104 includes only locating ring 162 affixed to the ground so that central opening 180 can receive at least a portion of the extension member 114. Or the lower locating assembly may include only the housing affixed to or embedded in the ground so that opening 170, for example, can receive an extension member or a portion of one.

Referring again to FIGS. 13-15, exemplary locating mechanism 100 is shown in progressive positions or different stages of engagement, and its operation is described. Many of the element numbers have been omitted from these figures for purposes of simplicity. FIG. 13 shows extension member 114 in a retracted position before the upper and lower locating assemblies contact one another. When drive unit 110 is energized, all of the components of extension member 114 move in a downward direction together toward lower locating assembly 104. As the extension member 114 descends, the lower end 142 of outer sleeve 132 eventually contacts the top surface 182 of plug 164. Biasing element 166 begins to compress as extension member 114 continues to extend, forcing the plug down and away from the central opening of the locating ring 162. As extension member 114 continues to descend, angled surface 143 may contact central opening 180, particularly at the upper end of the central opening. The interaction of the angled or tapered surface 143 with the central opening 180 can help locate the AGV more accurately or precisely by bringing upper locating assembly 102 into full alignment with lower locating assembly 104 even if the upper and lower locating assemblies were slightly misaligned when extension member 114 began to descend.

Figure 14:
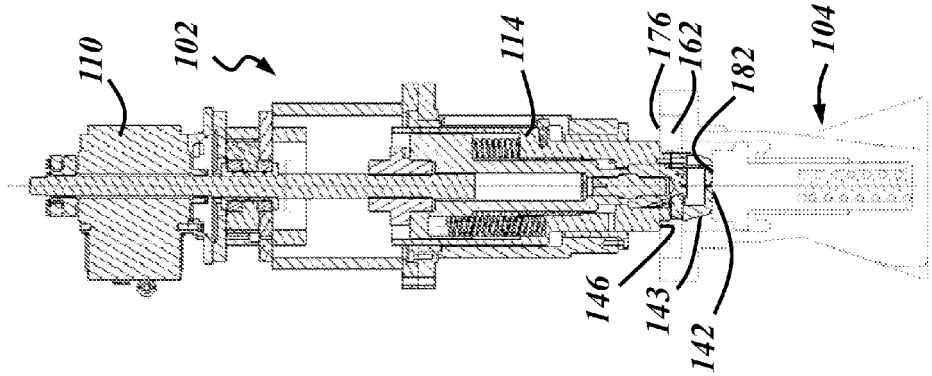
FIG. 14 shows the locating mechanism of FIG. 13, where the upper and lower locating assemblies at least partially engaged.
Figure 15:
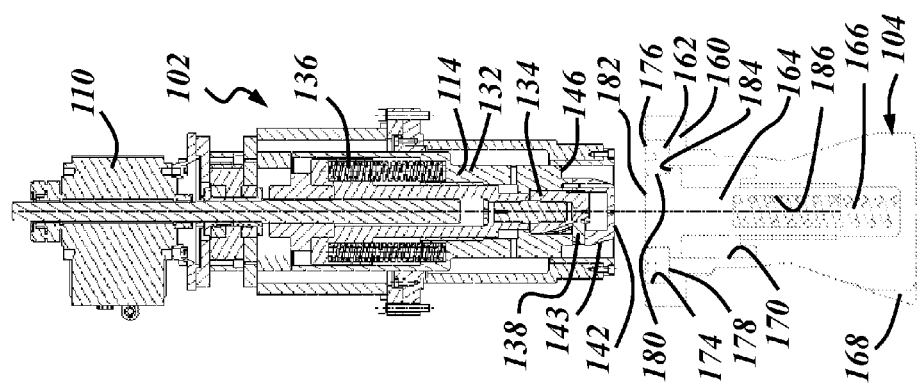
FIG. 15 shows the locating mechanism of FIG. 14, where the upper and lower locating assemblies are engaged.
Figure 16:
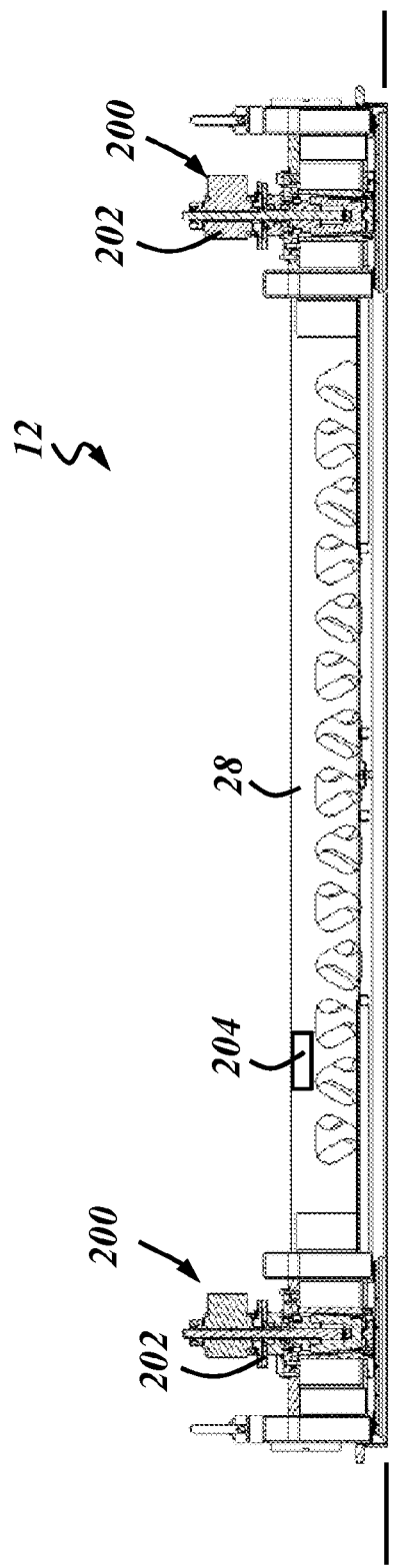
FIG. 16 is a side cross-sectional view of the AGV of FIG. 2, including cross-sectional views of leveling assemblies.

The next portion of the exemplary extension member 114 to contact the lower locating assembly 104 is the lower shoulder 146 of outer sleeve 132, as shown in FIG. 14, where shoulder 146 contacts the top surface 176 of locating ring 162. Up to this point, all of the components of the extension member 114 have been descending together in unison. When the extension member 114 contacts locating ring 162 and the drive unit continues to drive extension member 114, the weight of the AGV, to which the upper locating assembly is attached, provides sufficient resistance to begin compressing biasing elements 136 of extension member 114. As biasing elements 136 compress, inner rod 134 continues to move in a downward direction, while outer sleeve 132 remains stationarily seated on locating ring 162. As inner rod 134 moves further downward, cam surface 154 moves along cam ends 156 of fingers 138, forcing the fingers radially outward so that the locking ends 158 of the fingers engage central opening 180 of the locating ring 162, as shown in FIG. 15. In this embodiment, the locking ends 158 of fingers 138 include an angled surface matching the angle of a chamfer on the lower edge of the central opening of the locating ring. Of course, this is only one manner in which the fingers 138 can engage the locating ring 162. The fingers and the locating ring can be formed and arranged in a variety of ways to allow the upper and lower locating assemblies 102, 104 to engage one another and lock together to effectively secure the AGV to the ground to help stabilize it. For example, fingers 138 could extend into radially oriented apertures or recesses formed in the central opening of the locating ring, or fingers 138 could extend such that they lie entirely below the locating ring and rest against its bottom surface or overhang, to name but a few examples. As previously mentioned, fingers 138 could also be omitted entirely.

After the upper and lower locating assemblies 102, 104 are engaged and exemplary fingers 138 have extended as far as they can, continued operation of the drive unit 110 will cause the housing 112 to move in an upward direction, away from the lower locating assembly 104. Because the housing 112 is attached to the AGV, the AGV moves upward or is lifted further off of the ground. Accordingly, the exemplary locating mechanism 100 described herein may also be used in a leveling capacity.

In the particular embodiment of locating mechanism 100 shown in the figures, disengagement of upper locating assembly 102 from lower locating assembly 104 can be accomplished by simply reversing drive unit 110. In this embodiment, this means reversing the direction of rotation of motor 116 and lead screw 120. When drive unit 110 is reversed, the AGV is lowered if any lifting of the AGV occurred after the locating assemblies engaged one another. Further reverse operation of drive unit 110 retracts fingers 138 into extension member 114, then retracts inner rod 134 until biasing elements 136 are relaxed, at which time all components of extension member 114 move together to retract into housing 112. The overall amount of the extension of extension member 114 depends on the particular application and on such factors as the spacing between the ground and the AGV framework and on the desired amount of lifting capability. In one embodiment, extension member 114 extends approximately 1-4 inches from its retracted position to engage the opposite locating assembly and can further extend approximately another 1-4 inches to lift the AGV.

Of course the locating mechanism described and depicted in the figures is only one example of a variety of possible locating mechanisms. Other locating mechanisms are possible, including any mechanism having an extension member that engages an assembly on either the AGV or in the ground. For example, the extension member may extend downward from the AGV (as just described), or it may extend upward from the ground or from lower locating assembly 104. It is not necessary that the extension member be maintained as part of the upper locating assembly, as it could just as easily be a part of the lower locating assembly instead. In another example, one of the tipper or lower locating assemblies may include an extension member having a conical or frustoconical end that engages a corresponding opening on the other locating assembly to help locate and/or otherwise stabilize the AGV. In another example, electrically or otherwise actuated clamps may extend from the AGV or from the ground to clamp or grasp corresponding clamping points in the ground or on the AGV to help stabilize the AGV. This is to name and generally describe but a few possible alternative locating mechanisms. These and other alternative locating mechanisms may also double as components of leveling mechanisms by including actuation that can be used in a leveling capacity as well.

Figure 18:
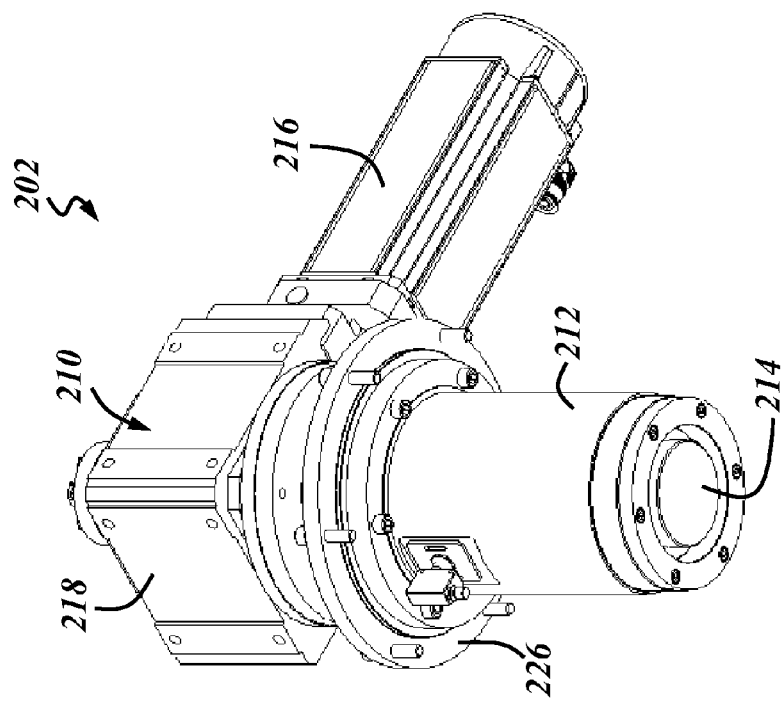
FIG. 18 is a bottom isometric view of the exemplary leveling assembly of FIG. 17.
Figure 19:
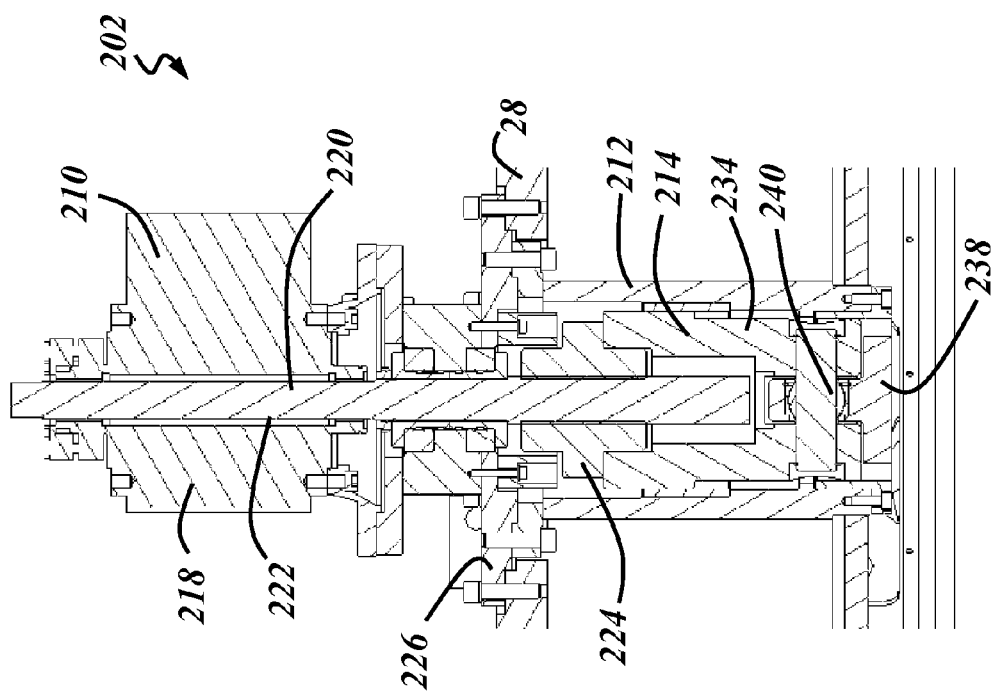
FIG. 19 is a cross-sectional view of one of the leveling assemblies of FIG. 16.

Referring now to FIGS. 16-21, an exemplary leveling mechanism 200 is shown. Leveling mechanism 200 can help position and/or orient AGV 12. FIG. 19 shows components of an exemplary leveling mechanism 200 in cross-section attached to the support structure of AGV 12. The exemplary leveling mechanism 200 includes one or more leveling assemblies 202 and sensor group 204.

Figure 17:
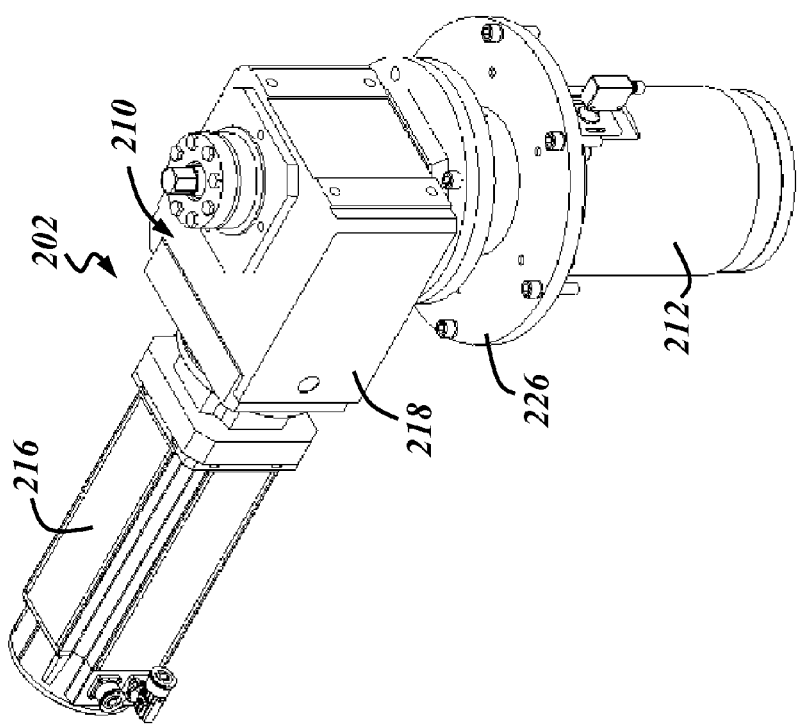
FIG. 17 is a top isometric view of an exemplary leveling assembly that may be used with the AGV of FIG. 2.

Referring now to FIGS. 17 and 18, an exemplary leveling assembly 202 is shown and includes a drive unit 210, a housing 212, and an extension member 214. Drive unit 210 may include any actuator that can extend and/or retract extension member 214 away from and/or toward the ground or floor. In this embodiment, drive unit 210 includes a motor 216, a gearbox 218, and a lead screw 220, which is best shown in FIG. 19. Motor 216 is preferably an electric motor, such as a servo or other type of motor, that interfaces with gearbox 218 to change the orientation of the motor output from a horizontal axis to a vertical axis. The gearbox 218 may also include gearing to alter the speed of the rotational motion transferred to the lead screw 220. Lead screw 220 converts the rotational motion originating at motor 216 to linear motion in the vertical direction. Lead screw 220 includes threaded rod 222 and collar 224. Threaded rod 222 includes a longitudinal axis that is oriented generally vertically in this embodiment and rotates to extend the extension member away from the AGV. Threaded rod 222 supports at least a portion of the weight of the AGV when the extension member is engaged with the ground. In a preferred embodiment, lead screw 220 is a ball screw and collar 224 is a recirculating ball assembly. Drive unit 210 can also be any other type of actuator known in the art, such as a fluid powered actuator, an electromagnetic actuator, or any other type of actuator.

Housing 212 is a structure that houses and/or provides attachment points for some of the components of drive unit 210 and of extension member 214. The housing may optionally include various other features such as flange 226 to provide attachment points to attach the leveling assembly 202 to the AGV support structure.

Extension member 214 may include any member that can extend away from the AGV to contact or engage the ground and may be used to help level the AGV by supporting at least a portion of the weight of the AGV. Extension member 214 may alternatively engage any other component, such as a pad or plate, supported by or installed in the ground. In the embodiment shown in the figures, extension member 214 can extend downward away from the leveling assembly 202, and therefore away from the AGV, when the drive unit 210 is operated. The exemplary extension member 214 shown in the figures is attached to drive unit 210 and disposed at least partially within housing 212 and includes rod 234 and foot 238. Rod 234 is a generally cylindrical component having its upper end attached to drive unit 210, and more specifically to collar or ball assembly 224 in this embodiment. The outer surface of rod 234 may be in contact with portions of the inner surface of housing 212, or with bushings or other low friction members disposed within the housing, to restrict the radial movement and guide the axial movement of extension member 214.

Foot 238 is the component of extension member 214 that contacts the ground during a leveling procedure. In this embodiment foot 238 is a swivel foot that is attached at the lower end of rod 234 with a pin and bearing assembly 240 to provide a degree of freedom to the foot so that its bottom can remain flat on the ground, no matter the orientation of the AGV with respect to the ground.

Sensor group 204 may include one or more stabilization sensors that collect information regarding the position, alignment, and/or orientation of the AGV. Each sensor may be electronically coupled to ECU 26 or some other control unit or units to provide stabilization information thereto. The control unit(s) that receive the information may use it to control one or more locating extension member or leveling extension member. For example, a plurality of sensors may be attached to the AGV to detect AGV distance from the ground at multiple locations, provide the distance information to the control unit, and the control unit may adjust or otherwise control an extension member accordingly. This distance information may be provided to a control unit where it can be used to determine the position and orientation of the AGV with respect to the ground or with respect to any other known axes or planes. Sensor group 204 could also include one or more accelerometers or clinometers to collect orientation information. For example, one clinometer may be provided for each of the length and width directions of the AGV to help determine the angle of the AGV with respect to the earth along multiple axes. The sensors may of course be of any other variety known in the art and may alternatively or additionally be included or used as part of a locating mechanism, particularly where the locating mechanism included leveling capability.

Figure 20:
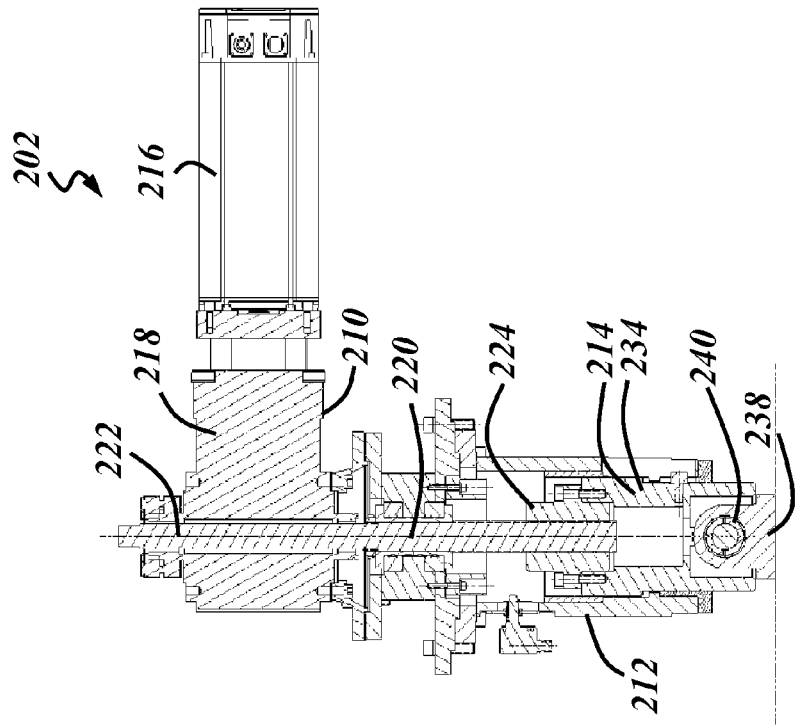
FIG. 20 is a cross-sectional view of one of the leveling assemblies of FIG. 16 showing the leveling assembly not engaged with the ground.
Figure 21:
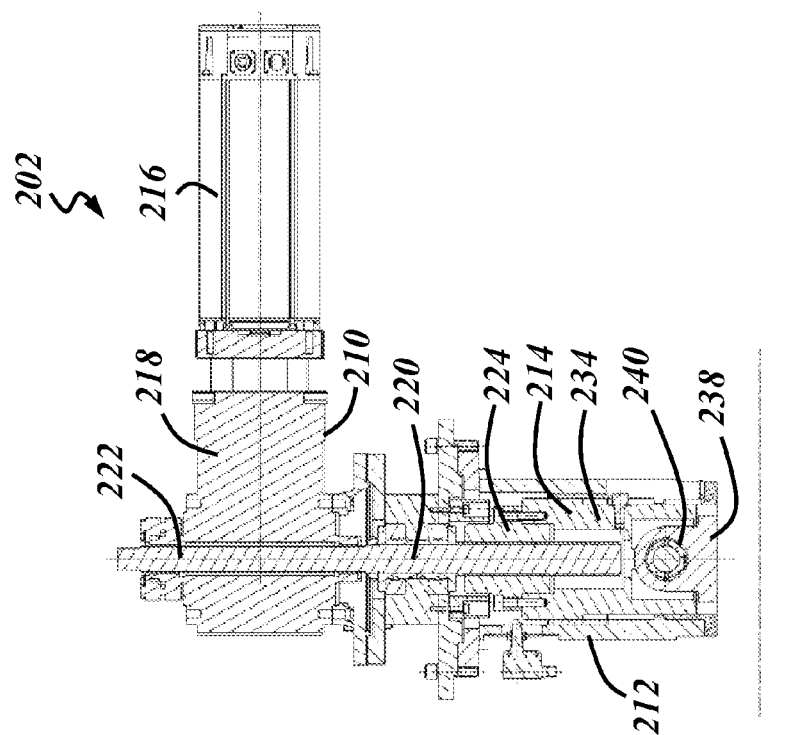
FIG. 21 shows the leveling assembly of FIG. 20 engaged with the ground.

Referring to FIGS. 20 and 21, leveling assembly 202 is shown in progressive positions or different stages of engagement. FIG. 20 shows extension member 214 in a retracted position such that the foot 238 of extension member 214 does not extend beyond the lower end of housing 212. When drive unit 210 is energized, extension member 214 moves in a downward direction toward the ground or toward a plate or other member supported by or embedded in the ground. As the extension member 214 extends further, the foot 238 contacts the ground. When this happens and the drive unit 210 continues to operate, extension member 214 extends further and the AGV moves upward in the region where leveling assembly 202 is attached, effectively being lifted by leveling assembly 202. Of course, lowering the AGV and retracting extension member 214 is simply a matter of reversing drive unit 210. The overall amount of the extension of extension member 214 depends on the particular application and on such factors as the spacing between the ground and the AGV framework and on the desired amount of lifting capability. Generally, ECU 26 may send command signals to leveling mechanism 200 which control the operation of extension member 214. In one embodiment, extension member 214 extends approximately 1-4 inches from its retracted position to engage the ground and can further extend approximately another 1-4 inches to lift the AGV.

Of course the leveling mechanism described and depicted in the figures is only one example of a variety of possible leveling mechanisms. Other leveling mechanisms are possible, including any extension member that engages the ground, such as extension member 114 of the previously described locating mechanism. In one embodiment, leveling mechanism 200 includes a number of leveling assemblies 202 which, in conjunction with locating mechanism 100, control the overall orientation and height of the AGV. Each leveling assembly 202 may be operated separately so they act according to specific commands created for that assembly.

According to the various figures and descriptions of exemplary embodiments included herein, a method of using an AGV may be described that generally includes the steps of moving the AGV to a predetermined location, extending an extension member from the AGV and toward the ground, causing the extension member to engage the ground or a locating assembly installed in the ground, and stabilizing the AGV at the predetermined location. An AGV can be equipped with one or more locating or leveling assemblies, as described above for example, in order to perform the method.

The AGV can be guided or moved to the predetermined location along the ground, for example alongside a large workpiece. In instances where locating mechanisms are used, the predetermined position can be such that one or more upper and tower locating assemblies are generally aligned with one another. Preferably, a plurality of lower locating assemblies is installed in the ground (as shown, for example in FIG. 1) with each of the lower locating assemblies having a position that is known by or communicated to the AGV.

Once at the predetermined location, one or more extension members may be extending from the AGV and toward the ground. The extension member may be part of an upper locating assembly or part of a leveling assembly. In another method, an extension member may extend from a lower locating assembly installed in the ground and toward the AGV. The extension member is extending until it engages the ground or the locating assembly installed in the ground. Engagement may include contact with the ground or other component, receiving of an end portion of the extension member by an opening in the ground or other component, and/or placing upper and lower locating assemblies in a locked position so that their respective components are clamped or otherwise forced together. Engagement of locating assemblies in such a manner brings the AGV into a more accurate and precise known location than the AGV's guidance alone system would otherwise be able to do and can also effectively attach the AGV securely to the ground to help stabilize it. This can be useful when the payload of the AGV includes manufacturing equipment that is performing operations on a workpiece or when the payload includes a workpiece that is having manufacturing operations performed on it by other equipment, because accurate and precise locating of the payload with respect to a workpiece or other equipment relies on the accurate and precise locating of the AGV.

Some of the aforementioned types of engagement may also be considered stabilizing steps. For example, engaging upper and lower locating mechanisms by extending the extension member into an opening of another locating assembly fixes the location of the AGV along the ground, which is a form of stabilizing. Stabilizing may also include the steps of controlling the individual extension members, for example by extending or retracting them, to help level the AGV using information from stabilization sensors. Even if the AGV is level when at the desired location along the ground, stabilization may include extending extension members to raise the entire AGV to precisely located the payload to the desired location with respect to the ground and/or work piece.

A typical AGV may only be able to accurately position itself along the ground within approximately 5 mm or more using only its guidance system and drive and/or steering mechanisms, while manufacturing equipment such as drilling or welding machines must sometimes perform operations at precise locations on a workpiece within one thousandth of an inch or less. A stabilization system as described above may be able to precisely located an AGV and its payload to perform these types of precise manufacturing operations.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An automated guided vehicle (AGV), comprising:
a support structure;
a drive mechanism being attached to the support structure, the drive mechanism moves the AGV along the ground; and
a stabilization system being attached to the support structure and having a leveling assembly that includes an extension member, wherein the extension member extends away from the AGV and engages the ground or an assembly installed in the ground to help level the AGV by supporting at least a portion of the weight of the AGV when the drive mechanism is not moving the AGV along the ground;

wherein the leveling assembly includes a lead screw having a threaded rod with a generally vertical longitudinal axis, and the threaded rod rotates to extend the extension member away from the AGV and supports at least a portion of the weight of the AGV.

2. The AGV of claim 1, wherein the stabilization system comprises an upper locating assembly that includes the extension member, and the extension member extends away from the AGV and engages a lower locating assembly installed in the ground to help locate the AGV at a known location.

3. The AGV of claim 2, wherein the upper locating assembly extension member includes one or more finger(s), and the finger(s) extend from the extension member and mate with corresponding features of the lower locating assembly so that the upper and lower locating assemblies can be in a locked engagement.

4. The AGV of claim 3, wherein the extension member further comprises an inner rod coaxially disposed within an outer sleeve, and relative axial movement between the inner rod and the outer sleeve causes the finger(s) to extend radially from the extension member and mate with an undercut feature of the lower locating assembly to place the upper and lower locating assemblies in the locked engagement.

5. The AGV of claim 2, wherein the lower locating assembly includes an opening that receives an end portion of the upper locating assembly extension member, the opening being shaped to have a close-fitting arrangement with the end portion of the extension member to help align the upper and lower locating assemblies together at the known location.

6. The AGV of claim 1, wherein the stabilization system comprises a plurality of extension members, and each of the extension members extends away from the AGV and engages the ground or one of a plurality of assemblies installed in the ground to help stabilize the AGV when the drive mechanism is not moving the AGV along the ground.

7. The AGV of claim 6, wherein the plurality of extension members includes at least one extension member that is part of an upper locating assembly and at least one extension member that is part of a leveling assembly, and the locating and leveling assemblies together help locate and level the AGV when the drive mechanism is not moving the AGV along the ground.

8. The AGV of claim 1, further comprising:
a retraction mechanism being coupled to the drive mechanism, and the retraction mechanism at least partially retracts the drive mechanism so that the weight of the AGV is supported by components other than the drive mechanism.

9. The AGV of claim 1, further comprising:
an electronic control unit (ECU); and
one or more stabilization sensor(s) being mounted to the AGV and electronically coupled to the ECU, wherein the ECU receives AGV stabilization information from the stabilization sensor(s) and uses the AGV stabilization information to help control the extension member.

10. The AGV of claim 9, wherein the one or more stabilization sensor(s) includes a clinometer that provides the ECU with stabilization information regarding an angle of one or more axes of the AGV with respect to the earth.

11. The AGV of claim 1, further comprising:
a payload being supported by the support structure and having one or more component(s) being specifically positioned on the AGV so that stabilizing the AGV at a known location with respect to the ground places the component(s) at a known position with respect to a work piece.

12. A stabilization system for an automated guided vehicle (AGV), comprising:
an upper locating assembly being attached to the AGV;
a lower locating assembly being installed in the ground at a known location; and
an extension member being part of either the upper or lower locating assembly and extending axially towards the other of the upper or lower locating assembly, wherein the extension member causes the upper and lower locating assemblies to be in a locked engagement when the AGV is at the known location and not moving along the ground;
wherein the extension member includes one or more finger(s), that extend radially from the extension member and mate with corresponding features of the other of the locating assemblies so that the upper and lower locating assemblies can be in a locked engagement at the known location.

13. The stabilization system of claim 12, wherein the extension member is part of the upper locating assembly, and the extension member extends away from the AGV and engages the lower locating assembly installed in the ground to help locate the AGV at the known location.

14. The stabilization system of claim 12, wherein the extension member is part of the lower locating assembly, and the extension member extends away from the ground and engages the upper locating assembly attached to the AGV to help locate the AGV at the known location.

15. The stabilization system of claim 12, wherein the extension member further comprises an inner rod coaxially disposed within an outer sleeve, and relative axial movement between the inner rod and the outer sleeve causes the finger(s) to extend radially from the extension member and mate with an undercut feature of the other of the locating assemblies to place the upper and lower locating assemblies in the locked engagement.

16. The stabilization system of claim 12, wherein the other of the locating assemblies includes an opening that receives an end portion of the extension member, the opening being shaped to have a close-fitting arrangement with the end portion of the extension member to help align the upper and lower locating assemblies together at the known location.

17. The stabilization system of claim 12, further comprising:
a leveling assembly being attached to the AGV, the leveling assembly includes an extension member that extends away from the AGV and engages the ground to help level the AGV by supporting at least a portion of the weight of the AGV.

18. The stabilization system of claim 12, wherein the stabilization system comprises a plurality of extension members, each of the extension members extending away from or toward the AGV to engage the ground or a locating assembly, and at least one extension member is located at each of four quadrants of the AGV.

19. The stabilization system of claim 18, wherein the stabilization system comprises at least four extension members, two of the extension members being part of different locating assemblies and two of the extension members being part of different leveling assemblies, the locating and leveling assemblies together help locate and level the AGV when the drive mechanism is not moving the AGV along the ground.

20. The stabilization system of claim 12, further comprising:
an electronic control unit (ECU); and
one or more stabilization sensor(s) being mounted to the AGV and electronically coupled to the ECU, wherein the ECU receives AGV stabilization information from the stabilization sensor(s) and uses the AGV stabilization information to help control the extension member.

21. A method of using an automated guided vehicle (AGV), comprising the steps of:
(a) moving the AGV to a predetermined location along the ground;
(b) extending an extension member from the AGV toward the ground;
(c) causing the extension member to engage the ground or a locating assembly installed in the ground; and
(d) stabilizing the AGV at the predetermined location;
wherein the method further comprises providing AGV stabilization information from one or more stabilization sensor(s) to an electronic control unit (ECU), and controlling the extension member using the AGV stabilization information.

22. The method of claim 21, wherein the extension member engages a locating assembly installed in the ground in step (c), and the method further comprises extending one or more finger(s) from the extension member and mating the finger(s) with corresponding features of the lower locating assembly.

23. The method of claim 22, further comprising further extending the extension member after the extension member engages the lower locating assembly to lift the AGV away from the ground.

24. The method of claim 21, wherein step (b) comprises extending an extension member from a leveling assembly and step (c) comprises causing the leveling assembly extension member to engage the ground.

25. The method of claim 21, wherein step (b) comprises extending a plurality of extension members from the AGV toward the ground and step (c) comprises causing each of the extension members to engage the ground or a locating assembly installed in the ground.

26. An automated guided vehicle (AGV), comprising:
a support structure;
a drive mechanism being attached to the support structure, the drive mechanism moves the AGV along the ground;
a stabilization system being attached to the support structure and having an extension member, wherein the extension member extends away from the AGV and engages the ground or an assembly installed in the ground to help stabilize the AGV when the drive mechanism is not moving the AGV along the ground;
an electronic control unit (ECU); and
one or more stabilization sensor(s) being mounted to the AGV and electronically coupled to the ECU, wherein the ECU receives AGV stabilization information from the stabilization sensor(s) and uses the AGV stabilization information to help control the extension member, wherein the one or more stabilization sensor(s) includes a clinometer that provides the ECU with stabilization information regarding an angle of one or more axes of the AGV with respect to the earth.

27. The AGV of claim 26, wherein the stabilization system comprises an upper locating assembly that includes the extension member, and the extension member extends away from the AGV and engages a lower locating assembly installed in the ground to help locate the AGV at a known location.

28. The AGV of claim 27, wherein the extension member includes one or more finger(s) that extend from the extension member and mate with corresponding features of the lower locating assembly so that the upper and lower locating assemblies are in a locked engagement.

29. The AGV of claim 28, wherein the extension member further comprises an inner rod coaxially disposed within an outer sleeve, and relative axial movement between the inner rod and the outer sleeve causes the finger(s) to extend from the extension member and mate with an undercut feature of the lower locating assembly to place the upper and lower locating assemblies in the locked engagement.

30. The AGV of claim 26, wherein the stabilization system comprises a leveling assembly that includes the extension member, and the extension member extends away from the AGV and engages the ground to help level the AGV by supporting at least a portion of the weight of the AGV.

* * * * *